United States Patent
Roach

[19]

[11] Patent Number: 6,068,449
[45] Date of Patent: May 30, 2000

[54] MAGNETOHYDRODYNAMIC PUMP

[76] Inventor: John F. Roach, 3763 S. Gillham Dr., Bloomington, Ind. 47403

[21] Appl. No.: 09/008,713

[22] Filed: Jan. 19, 1998

Related U.S. Application Data

[63] Continuation of application No. 08/594,858, Jan. 31, 1996, abandoned.

[51] Int. Cl.[7] .................................................. H02K 44/02
[52] U.S. Cl. ............................................................. 417/50
[58] Field of Search ................................ 417/50; 60/200.1

[56] References Cited

U.S. PATENT DOCUMENTS

| | | |
|---|---|---|
| 3,611,723 | 10/1971 | Theis, Jr. . |
| 4,749,890 | 6/1988 | Houston ..................................... 417/50 |
| 5,111,087 | 5/1992 | Butka . |
| 5,197,279 | 3/1993 | Taylor ..................................... 60/200.1 |
| 5,685,698 | 11/1997 | Smoll ........................................ 417/50 |

FOREIGN PATENT DOCUMENTS

| | | |
|---|---|---|
| 60-197155 | 10/1985 | Japan . |
| 1-126153 | 5/1989 | Japan . |
| 2 133 225 | 7/1984 | United Kingdom . |

OTHER PUBLICATIONS

W. R. Corliss, McGraw–Hill, N.Y., Dec. 1960.
Article entitled "Proplulsion System Has No Moving Parts", The New York Times, May 15, 1990, 2 pages.
Shames, Irving H., *Mechanics of Fluids,* Second Edition, McGraw–Hill Book Company, New York, New York, ©1982, pp. 129–131.
Halliday, David and Resnick, Robert, *Fundamentals of Physics,* Second Edition, John Wiley & Sons, New York, New York, ©1970, pp. 141–142.

*Primary Examiner*—Charles G. Freay

[57] ABSTRACT

The present invention is directed to a magnetohydrodynamic pump adapted for use in a closed propulsion system. In one embodiment, the magnetohydrodynamic pump includes a duct having a plurality of inlet openings for joining a plurality of streams of liquid into a common single stream and an outlet opening in fluid communication with a nozzle. The magnetohydrodynamic pump includes a pump chamber coupled to a diverging end of the nozzle, and the pump chamber includes a plurality of material output ports. Further, the magnetohydrodynamic pump includes two electrodes mounted on opposite sides of the pump chamber and two mutually attractive superconducting magnets mounted on opposite sides of the pump chambers.

5 Claims, 3 Drawing Sheets

MAGNETOHYDRODYNAMIC PUMP

This application is a continuation of Ser. No. 08/594,858 filed Jan. 31, 1996, abandoned.

The present invention relates generally to a magnetohydrodynamic pump. More particularly, the present invention is directed to a magnetohydrodynamic pump having a plurality of inlets and outlets and which can be adapted for use in a closed propulsion system.

BACKGROUND-DESCRIPTION OF PRIOR ART

The idea of reversing the momentum of a mass to achieve propulsion is not new. It has been used by Boeing aircraft for slowing down aircraft while in flight, and for both braking and moving the aircraft backwards while on the ground. It involves lowering a large structure, shaped like a cup, over the back of the jets engines. The force of gases on the structure over come the foreword acceleration of the jet engines, resulting in a reverse thrust. This type of system is an open system in which matter is spewed into the environment. A closed system is one in which no mater or energy is expelled from the propulsion system. The present invention is directed to a magnetohydrodynamic pump that is adapted for use in a closed propulsion system. In U.S. Pat. No. 5,111,087 to Butka, there is disclosed a system utilizing a magnetohydrodynamic pump in which liquid is accumulated in a duct and moved by a magnetic field to apply a thrust.

The Butka patent has the following limitations:

(a) The electrode placement is such that the current is parallel to the liquid flow. This breaks the Lorenz Force Law which states that the flow, current, and magnetic field must all three be mutually perpendicular.

(b) This system describes using water as the working fluid. The use of water is impractical because the large currents necessary for operational force would require thousands of volts. This high voltage coupled with high current will result in a tremulous amount of heat being transferred into the water. This would quickly vaporize the working fluid.

(c) Since symmetrical ducts exist at both the top and bottom of the structure, it is difficult to see how a unidirectional force is obtained. Water is a fluid and can not be compressed and since this is closed system, the velocity of the fluid should be approximately the same at both the top and bottom constricted ducts. This means the force pushing on the top duct should cancel the force pulling on the bottom duct.

SUMMARY OF THE INVENTION

One form of the present invention is directed to a magnetohydrodynamic pump with plural inlets and outlets and which could be used in a closed propulsion system.

The invention uses a magnetohydrodynamic (MHD) pump to move a conductive fluid (liquid potassium) around a closed loop or vessel. The magnetic field, electric current, and fluid flow of the pump are all three mutually perpendicular. In one closed propulsion system utilizing a magnetohydrodynamic pump of the present invention, the fluid flow direction is reversed and a unidirectional force is realized.

Some advantages of the present invention are:

(a) A novel feature of the invention is the unique geometry of the vessel required to realize a unidirectional force in a closed system.

(b) The maximization of the magnetic field of the pump. The super conducting magnets are placed as close together as practical while the electrode placement is as far apart as practical. This allows more force to be submitted along the current path and more power transfer to the fluid.

(c) Potassium, heated by means of a large current, quickly reaches the liquid state and is used as the working fluid. Since potassium has a very high conductivity large currents can be used thus creating a much larger Lorenz Force for a given magnetic field.

The invention both as to its construction and its method of operation, together with additional objects and advantages thereof, will be best understood from the following description of specific embodiments when read in connection with the accompanying drawings.

Figure 1:
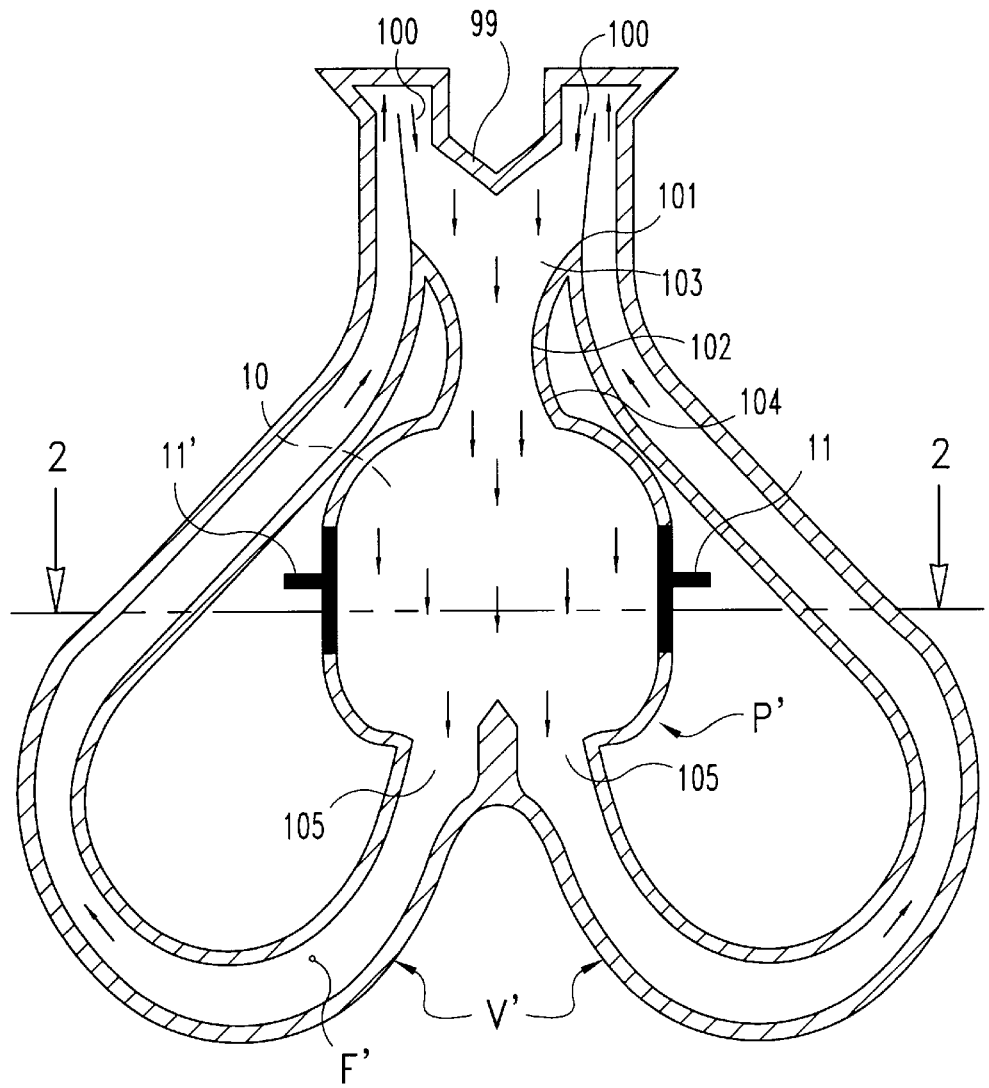
FIG. 1 is a cross-sectional view of a magnetohydrodynamic pump according to the present invention.
Figure 2:
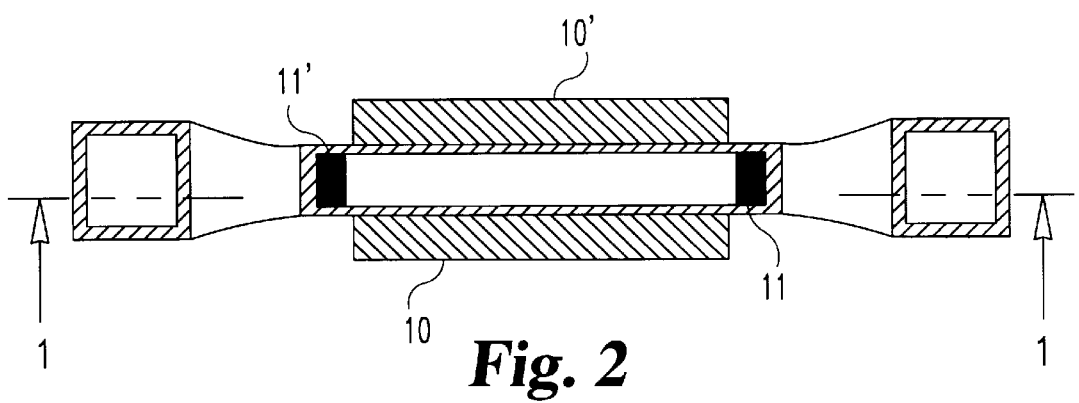
FIG. 2 is a cross-sectional view of the inventive magnetohydrodynamic pump through plane 2—2 of FIG. 1.

Reference Numerals in Drawings 10 superconducting magnet 1
10' superconducting magnet 2
11 electrode 1
11' electrode 2
P' fluid pump
V' fluid vessel
F' fluid

DESCRIPTION OF PREFERRED EMBODIMENTS

Referring further to FIG. 1, there is illustrated a duct 99 having a plurality of inlet openings 100 and, an outlet opening 101 with a passageway therebetween. The duct 99 is coupled to a nozzle 102. The nozzle 102 having a converging fluid flow end 103 and a diverging fluid flow end 104. The diverging end 104 of the nozzle 102 is coupled to the pump P'. In one embodiment fluid exiting the pump P' passes through at least one material output port 105, and in another embodiment through a plurality of material output ports 105. In one embodiment, the fluid is a liquid metal and the pump is formed of a non-conductive material selected from the group consisting of fiberglass, ceramics, and a composite material.

FIG. 1 is a drawing of the present invention. Super conducting magnet 10 and super conducting magnet 10' are positioned such that they are mutually attractive. If the north pole of super conducting magnet 10 is facing such that the magnetic flux is into the drawing, assuming current flows from positive to negative, current will be applied from 11 (positive) to 11' (negative). If 10 and 10' are positioned such that the magnetic flux is out of the drawing, current will flow from 11' to 11.

The fluid F' flow is in the direction of the arrows. The magnetic flux, current flow and the fluid F' flow are all three mutually perpendicular in accordance with the Lorenz Force Law.

In FIG. 1 potassium is used as the conductive fluid F' as required by the magnetohydrodynamic pump. A large initial startup current may be required to heat the potassium to a liquid state. After use, the potassium will remain in a liquid state from normal engine heat.

An alternative embodiment in FIG. 1 is the use of sodium as the conductive fluid F'. The structure of FIG. 1 must be made of a nonconducting material such as fiberglass, aluminum coated internally with Teflon, or composite fiber material.

Figure 3:
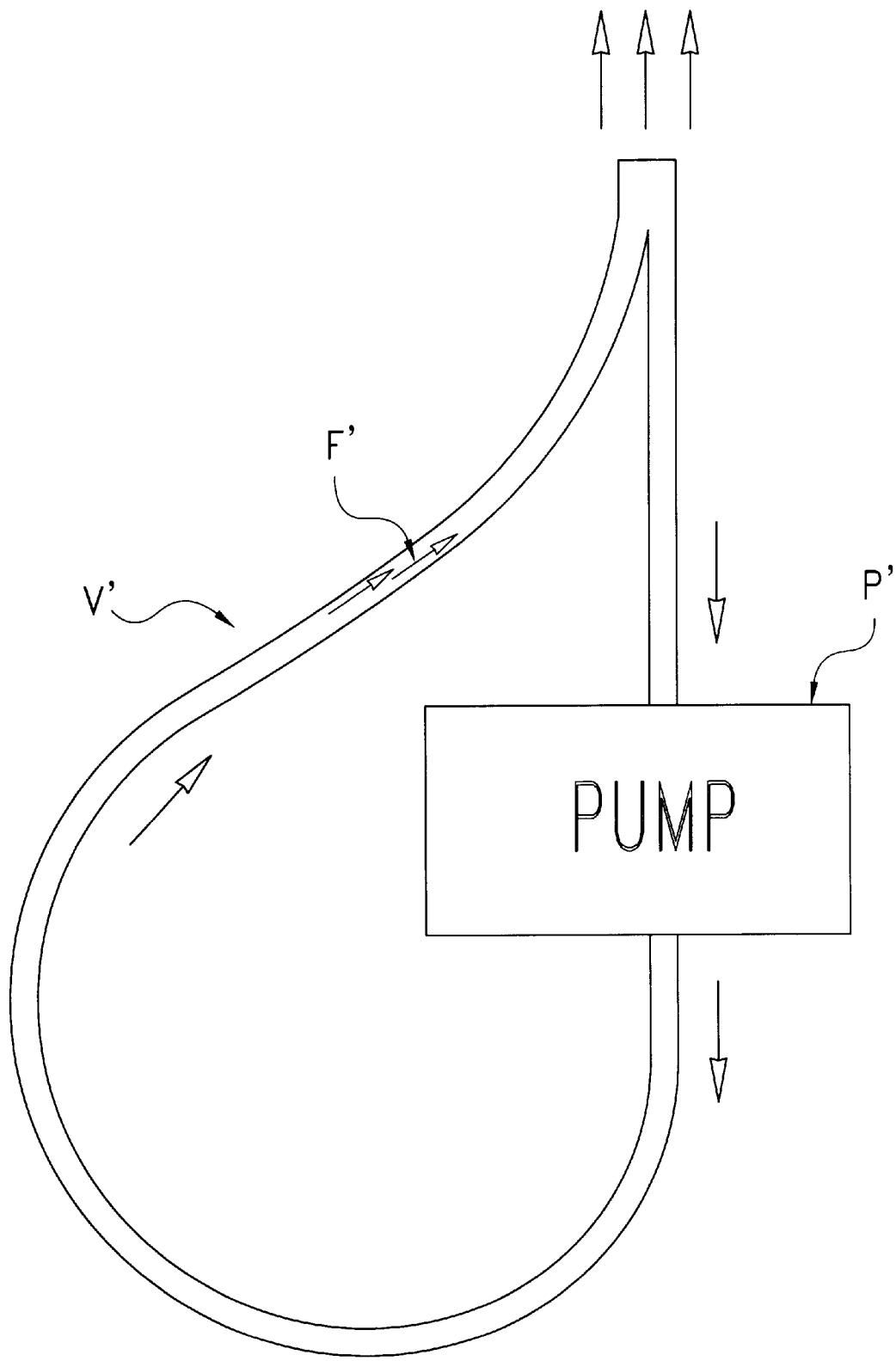
FIG. 3 is a diagrammatic view showing a further embodiment of the present invention.

FIG. 3 shows a diagrammatic drawing of an embodiment in which the pump P' and vessel V' act as interchangeable units. A number of vessels V' can be placed symmetrically around the pump P' for added performance. In one embodiment, a magnetohydrodynamic pump is included in a closed propulsion system in which the net force extracted from the system is proportional to the velocity of the fluid times the number of vessels used.

Figure 4:
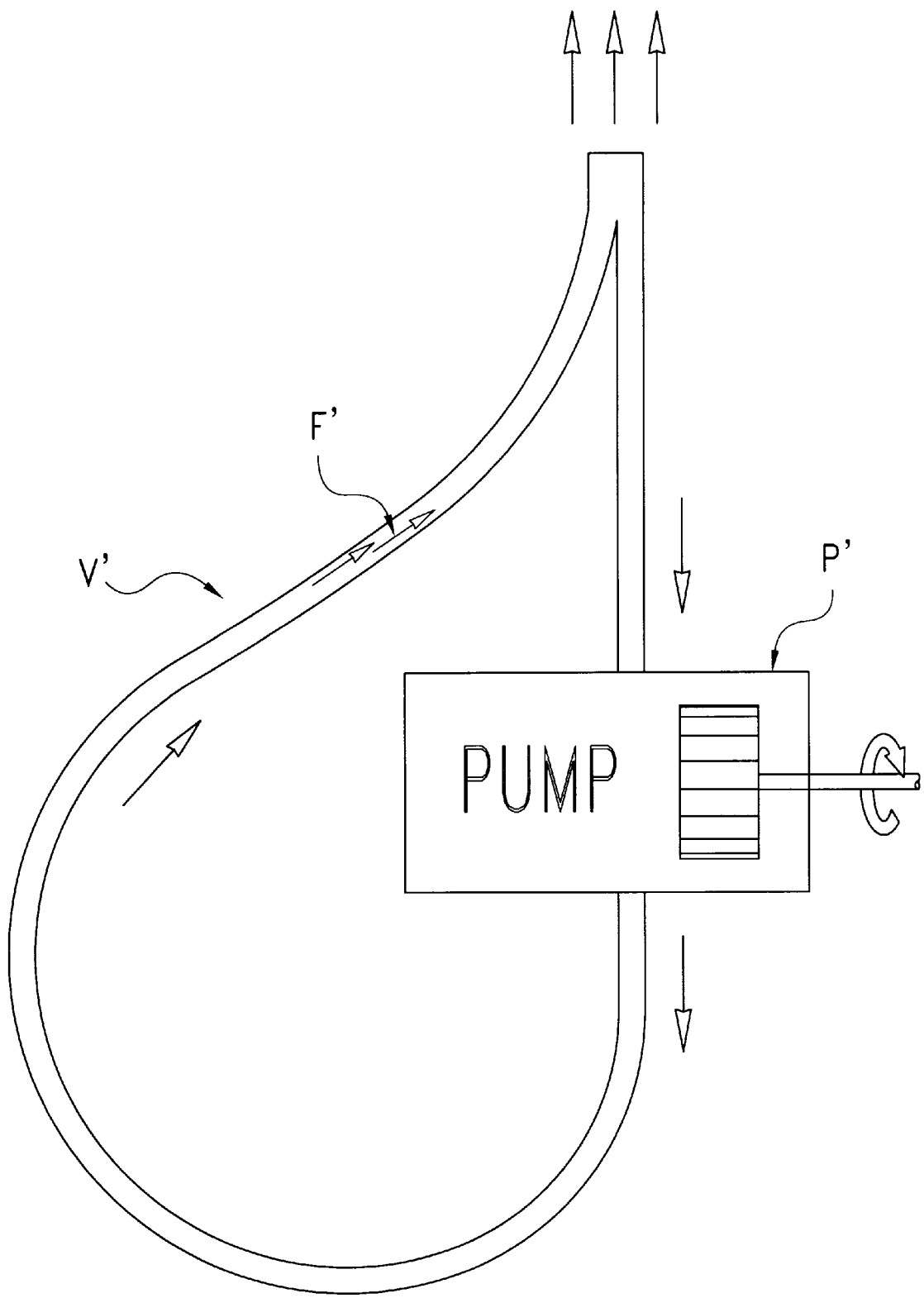
FIG. 4 is a diagrammatic view showing another embodiment of the present invention.

FIG. 4 is a diagrammatic drawing of a further embodiment which use a mechanical pump P' instead of a magnetohydrodynamic pump. This may find use in applications where there is an ample supply of rotary power. It could be used to propel a submarine or any number of land vehicles. Further experimentation is necessary to determine the full extent of practical applications for the invention.

The present invention has been disclosed in connection with specific embodiments. However, it will be apparent to those skilled in the art that variations from the illustrated embodiments may be undertaken without departing from the spirit and scope of the invention. For example, any power source capable of delivering either electrical or kinetic energy may be used. These and other variations will be apparent to those skilled in the art and are within the spirit and scope of the invention.

I claim:

1. A magnetohydrodynamic pump, comprising:
    a duct having a plurality of inlet openings and an outlet opening with a passageway therebetween, said plurality of inlet openings for joining a plurality of streams of a liquid into a common single stream;
    a nozzle having a converging end and an opposite diverging end, said converging end coupled to said outlet opening for receiving the single stream; and,
    a pump chamber having a material input port coupled to said diverging end, two mutually attractive superconducting magnets mounted on opposite sides of said pump chamber, two electrodes mounted on opposite sides of said pump chamber and a plurality of material output ports.

2. The magnetohydrodynamic pump of claim 1 further comprising:
    a plurality of asymmetric closed fluid passageway structures, each of said plurality of closed fluid flow passageway structures connecting from one of said plurality of material output ports to one of said plurality of inlet openings.

3. The magnetohydrodynamic pump of claim 1, wherein said plurality of fluid flow passageways are placed symmetrically around a centerline of the pump.

4. The magnetohydrodynamic pump of claim 1 wherein the pump is formed of nonconductive material, and wherein the fluid within the apparatus is a liquid metal.

5. The magnetohydrodynamic pump of claim 4 wherein said nonconductive material is selected from the group consisting of fiberglass or a composite material.

* * * * *